Aug. 16, 1938.                H. BUCKLIN                2,127,104
                               VEHICLE
                         Filed Oct. 21, 1936           2 Sheets-Sheet 1
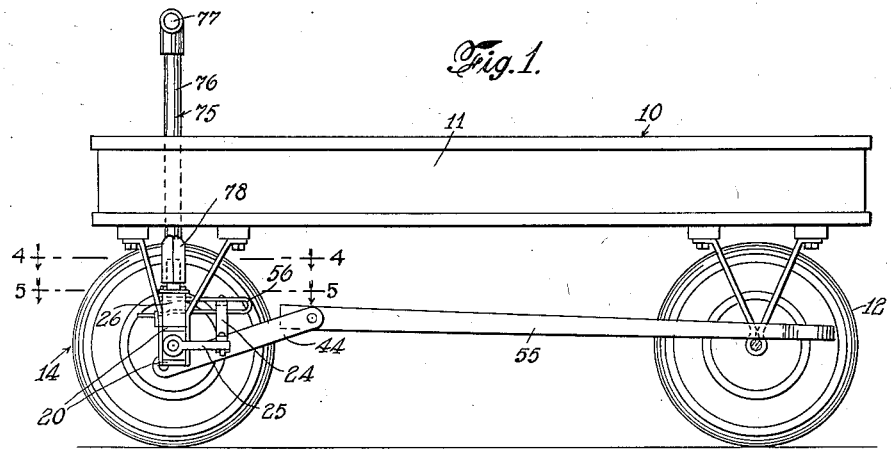
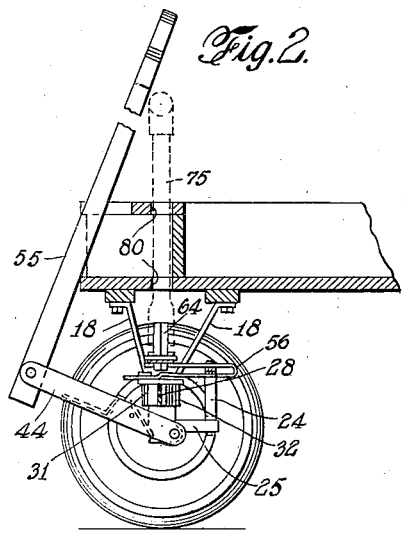
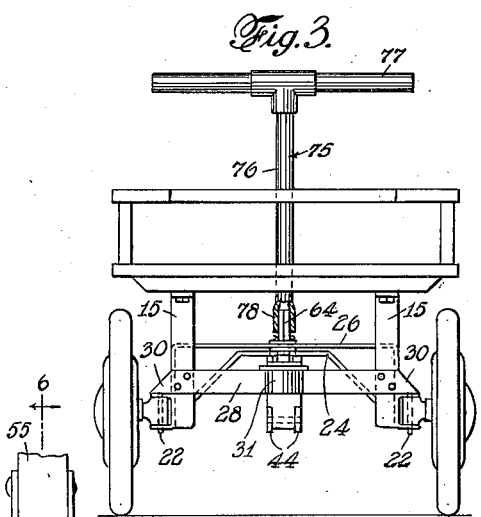
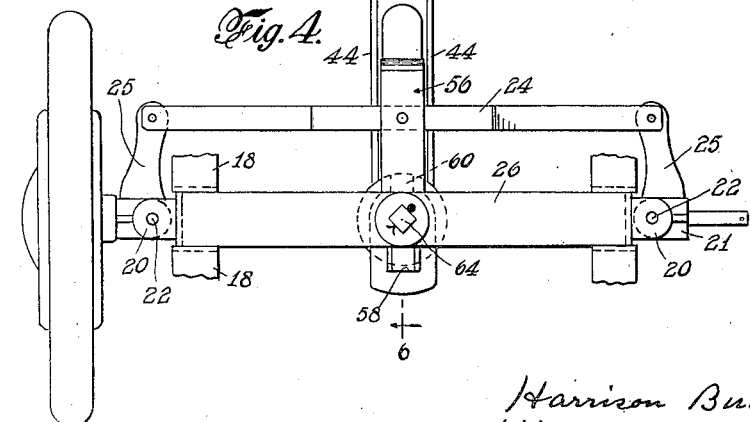
INVENTOR.
Harrison Bucklin
BY Williams, Rich & Morse
ATTORNEYS Aug. 16, 1938.   H. BUCKLIN   2,127,104
VEHICLE
Filed Oct. 21, 1936   2 Sheets-Sheet 2
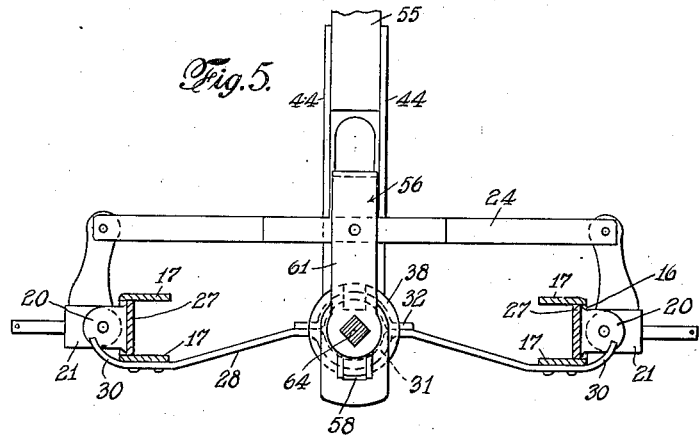
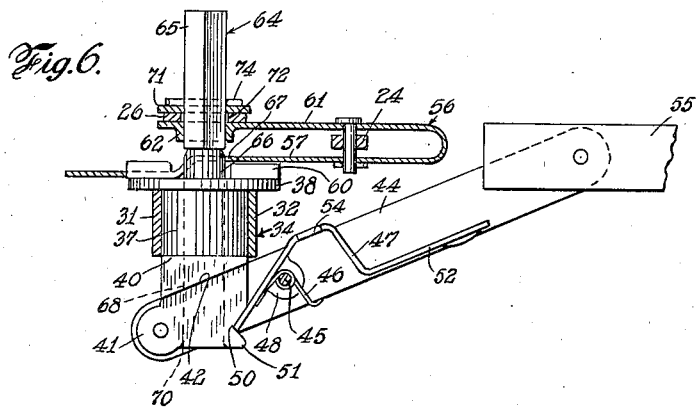
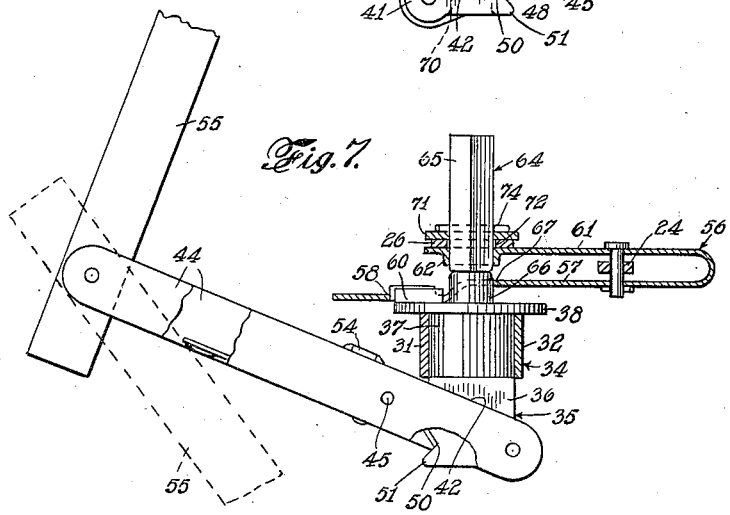
INVENTOR.
Harrison Bucklin
BY Williams, Rich & Morse
ATTORNEYS Patented Aug. 16, 1938

2,127,104

UNITED STATES PATENT OFFICE 2,127,104

VEHICLE

Harrison Bucklin, Rochester, N. Y.

Application October 21, 1936, Serial No. 106,737

6 Claims. (Cl. 280—87.01)

This invention relates to wheeled vehicles and is herein illustrated as embodied in a miniature wagon of the so-called coaster type.

Ordinarily the tongue, with which such wagons are equipped, is adapted to be employed in conjunction with the front wheel-and-axle assembly as a draft means by which the wagon may be pulled from place to place, and is adapted to be folded back with relation to the front of the vehicle so as to enable it in conjunction with said assembly to be employed by the occupant as a steering means when coasting. Such combined draft and steering means, despite their extensive adoption in the field to which the present invention is directed, are open to various objections, among which may be mentioned the fact that if they are designed for effective operation, when utilized in transporting the vehicle from place to place, they are incapable of use with the same degree of effectiveness and nicety of operation when employed as a steering medium under the control of the occupant, and vice versa.

The general object of the present invention is to provide in a wheeled vehicle, more specifically a wagon of the so-called coaster type, an improved front wheel-and-axle assembly which may be employed with equal effectiveness both as a draft means by which the wagon may be pulled from place to place and as a steering means on which the occupant may safely rely when coasting.

To the above and other ends I contemplate a front wheel-and-axle assembly adapted to function as a draft means and as a tongue-actuated steering means and to be rendered inoperative as such means, in combination with a steering column which, when said assembly is rendered inoperative as a draft means and as a tongue-actuated steering means, constitutes a reliable medium through which the assembly may be caused to function as a steering means under the control of an occupant when coasting.

Other objects and advantages will become apparent from the following description taken in conjunction with the accompanying drawings and in which—

Fig. 1 is a view partly in section and partly in elevation of a wagon embodying the invention, the front wheel-and-axle assembly of which is illustrated as rendered inoperative as a draft means and as a tongue-actuated steering means;

Fig. 2 is a fragmental sectional view illustrating the front wheel-and-axle assembly as conditioned for use as a draft means and as a tongue-actuated steering means;

Fig. 3 is a front view of the wagon as it appears from the left in Fig. 1;

Fig. 4 is an enlarged sectional view taken on line 4—4 of Fig. 1, and showing in plan the front axle assembly;

Fig. 5 is an enlarged sectional view taken on line 5—5 of Fig. 1, and showing details of construction entering into the front wheel-and-axle assembly;

Fig. 6 is a sectional view taken substantially on line 6—6 of Fig. 4, and illustrating the relative positions of various related elements when the front wheel-and-axle assembly is conditioned as shown in Fig. 1;

Fig. 7 is a view similar to that of Fig. 6 and illustrating the relative position of various related elements when the front wheel-and-axle assembly is conditioned as shown in Fig. 2.

Referring to the drawings, the numeral 10 indicates generally a miniature wagon which includes a body 11 of any appropriate design, an ordinary rear wheel-and-axle assembly 12, and an improved front wheel-and-axle assembly 14 constructed in accordance with the present invention.

The front wheel-and-axle assembly 14 includes a pair of brackets 15, each of which is constructed from a channel iron from which is removed a portion of its web or bottom wall 16 so as to leave a substantial length of its side walls 17 free to be bent to form a pair of strut-like arms 18 adapted to be suitably connected to the floor wall of the wagon body 11 relatively near its front and side margins. As shown most clearly in Figs. 3, 4 and 5, the web 16 of each bracket 15 is bent outwardly so as to provide a pair of lug-like bearing elements 20, spaced vertically from each other and adapted to receive therebetween a pair of stub shafts 21, on which the wheels of the assembly 14 are carried. These stub shafts are pivotally connected to the bearing elements 20 by a pair of bearing pins 22, and are linked together for movement in unison by an arch-like connector element 24, the downwardly and outwardly extending leg portions of which are pivotally connected to a pair of rearwardly extending arms 25 rigidly connected to the stub shafts and movable therewith. In order to lend rigidity to the brackets 15, they are tied together by a tie member 26 disposed in the vertical plane of the bearing pins 22, the downwardly extending leg portions 27 of the tie member being disposed intermediate the side walls 17 of the channel irons (from which the brackets 15 are formed) and suitably connected to the webs 16 thereof.

In order to lend further rigidity to the brackets 15 and in order to reinforce the bearing elements 20 against bending upwardly (under the influence of any undue load-strains) about their points of connection with the webs 16 of said channel irons, there is provided a tie member 28 which is connected near its opposite ends to the front side walls 17 of the brackets and terminates in rearwardly extending abutment fingers 30 disposed directly above and in abutting engagement with the uppermost bearing elements. As to the tie member 28, it is so shaped intermediate its ends as to provide a yoke 31 which is complementary to an associated yoke 32 secured to the tie member in such a relation to the yoke 31 that such yokes collectively form a cylindrical bearing sleeve 34, the longitudinal axis of which is located in a plane passing through the axes of the bearing pin 22.

Associated with the tie member 28, is a draft unit 35 which is adapted, as will hereinafter more clearly appear, to be rotated about its vertical axis throughout 360° under certain conditions and to be limited under other conditions to a substantially less extent in its rotation. The draft unit 35 presents at its lower end a coupling head 36, is machined or otherwise formed intermediate its ends with a bearing 37 journalled in the bearing sleeve 34, and is provided at its upper end with a flange 38 of a diameter substantially greater than the diameter of said bearing. It is to be observed that the draft unit 35 is formed with a ledge or shoulder 40 at the juncture of the coupling head 36 and the bearing 37, and that the bearing sleeve 34 rests on such ledge and serves in conjunction with the flange 38 which overlies the bearing sleeve to retain the draft unit against axial displacement without, of course, in any way impeding rotation thereof.

As shown most clearly in Figs. 6 and 7, the coupling head 36 is formed at its lower end with an offset lug 41, disposed at an angle corresponding to that of a pair of inclined shoulders 42 which are machined or otherwise formed on opposite sides of the coupling head. To the lug 41 are pivotally connected a pair of links 44, which are tied together intermediate their ends by a bolt or rivet 45 on which is carried a retaining spring 46, one end of which is looped over one of the links and the other end of which is adapted to engage the detent end of a latch 47. The latch 47 is provided with a pair of ears 48 through which the bolt or rivet 45 passes, and its detent end is adapted to assume a locking position within a retaining notch or detent 50 formed in the coupling head 36, it being observed that the relation of the latch 47 to the retaining notch or detent is such that as the links 44 are moved into their positions shown in Figs. 6 and 7, the detent end of the latch will engage the toe-like protuberance 51 (which is formed on the coupling head by reason of the presence of detent notch), will ride over that protuberance and will then be snapped into locking position under the action of the spring 46. In order that the detent end of the latch 47 may be conveniently lifted out of locking position within the detent 50, such latch is formed with a releasing arm 52 by which the latch may be readily moved in a clockwise direction, as viewed in Fig. 7, about the bolt or rivet 45 on which it is pivotally mounted, it being observed that the latch is prevented from undue displacement in a counterclockwise direction, when the latch is released and the links 44 are moved well out of their positions shown in Figs. 6 and 7, by a pair of stop lugs 54 which extend laterally from the latch and are adapted to engage the longitudinal edges of the links 44.

To the forward ends of the links 44 is pivotally connected a tongue 55, the pivoted end of which is so disposed intermediate the links that it is permitted to pass the outer end of the releasing arm 52, as when the tongue is moved from one position to another about its pivotal connection. In order that the tongue 55, when employed in conjunction with the front wheel-and-axle assembly 14 as a draft means, may be utilized to exert a steering action on the wheels of that assembly, the connector element 24 is pivotally connected intermediate its ends to a clutch unit 56 which is adapted to be locked to the draft unit 35 so that it may be moved in response to steering movements of the tongue. The clutch unit 56 comprises a substantially U-shaped spring-like element, one arm 57 of which is turned downwardly at its outer end and there provided with a slot 58 adapted to receive a locking lug 60 secured to the flange 38 of the draft unit. The other arm 61 of the clutch unit is provided with a square opening, about which is formed a similarly shaped collar 62 adapted to receive a steering column 64, the upper end 65 of which is square in cross section and is adapted to snugly fit within the collar and the remaining portion or lower end 66 of which presents a cylindrical surface, the juncture between the upper and lower ends of the steering column being in the vicinity of a plane passing transversely through such column at a point somewhat below the lower end of said collar and an appreciable distance above the upper face of the draft-unit flange 38. It will be observed that the lower end 66 of the steering column passes through an elongated opening 67, formed in the arm 57 of the clutch unit 56, and is journalled within an opening 68 formed in the draft unit 35 and extending throughout the axial length thereof. Upward displacement of the steering column 64 with relation to the draft unit 35 is prevented by reason of the fact that the lower end 66 of that column is slightly upset or expanded as shown at 70 to fit the enlarged lower end of the opening 68, whereas downward displacement of the steering column is prevented by reason of the fact that the upper end 65 of such column is provided with a thrust washer 71 which overlies the tie member 28 (through which the tie rod extends by way of a round opening 72) and is held against displacement by a cotter pin 74. In order that the steering column 64 may be conveniently employed by an occupant of the wagon to exert a steering action on the wheels of the front wheel-and-axle assembly, when the tongue is positioned as shown in Figs. 1 and 6 and the wagon is thus especially conditioned for coasting, there is provided a steering handle 75 which comprises a tubular shaft 76 provided at its upper end with a T-piece 77 and formed at its lower end with a socket 78 which is adapted to fit over and interlock with the upper end 65 of the steering column, the tubular shaft being disposed normally in a vertical position and accommodated within suitable openings 80 formed in such members of the wagon body 11 as are disposed in direct alignment with the steering column.

From the foregoing it will be understood that when the parts of the front wheel-and-axle assembly are conditioned for use as shown in Fig. 7, such assembly may be then employed as a draft means, and also as a tongue-actuated steering means, inasmuch as such movement of the tongue 55 as will cause the draft unit 35 to rotate within the bearing sleeve 34 will cause the clutch unit 56 to correspondingly move and thus so shift the connector element 24 as to move the stub axles 21 about their pivot points in one direction or the other.

In order to so condition the front wheel-and-axle assembly as to render that assembly inoperative as a draft means and as a tongue-actuated steering means (in which case the steering column 64 may be then relied on as a steering medium under the control of an occupant when coasting), the wagon is turned up on its rear-wheel end for convenience sake in carrying out the conditioning operation, whereupon the detent end of the latch 47 is released from the detent 50 by depressing the releasing arm 52 against the action of the spring 46, it being observed that such arm is readily accessible for thumb manipulation and is also so located that it will be automatically depressed if the tongue 55 is allowed to swing about its pivotal connection with the links 44 into arm-engaging position as indicated in dotted lines in Fig. 7. After releasing the latch 47, the links 44 are moved about their point of pivotal connection with the coupling head 36, whereupon the arm 57 of the clutch unit 56 is disengaged from the locking lug 60 so as to disconnect the clutch unit from the draft unit 35. Upon disconnecting the clutch unit and draft unit from each other, the latter is rotated to its position indicated in Fig. 6, while maintaining the links 44 and the tongue 55 in an extended and substantially aligned relation to each other and to the axis of rotation of the draft unit. Following the carrying out of the foregoing steps, the end of the tongue 55 is swung toward the bottom of the wagon body, while maintaining the links 44 in a substantially aligned position with relation to the draft unit 35, whereupon the links are swung rearwardly and toward the bottom of the wagon body, thus causing the end of the tongue to move rearwardly and assume a position intermediate the wagon body and the axle of the rear wheel assembly 12 as the links assume their position shown in Figs. 1 and 6. As the links 44 are moved into their positions just mentioned, the detent end of the latch 47 will ride over the protuberance 51 and will then be snapped into locking position under the action of the spring 46 so as to hold the links and in turn the tongue in their respective inactive positions. Upon rendering the front wheel-and-axle assembly inoperative as a draft means and as a tongue-actuated steering means, the steering column 64, which is then free to rotate independently of the draft unit 35, constitutes the only steering medium and may be conveniently utilized through the aid of the steering handle 75 by an occupant when coasting.

In order to re-condition the front wheel-and-axle assembly so as to enable it to be employed as a draft means and as a tongue-actuated steering means, it becomes necessary merely to release the links 44 from their locked positions shown in Figs. 1 and 6, swing them to an extended position substantially in alignment with the draft unit 35 so that the tongue 55 may be moved to a similar extended position, so rotate the draft unit as to establish an interlocking relation between the clutch unit arm 57 and the locking lug 60, and then move the links to their locked positions shown in Fig. 7.

Although only one form of the invention is herein shown and described, it will be understood that various changes may be made without departing from the spirit of the invention or the scope of the following claims.

What is claimed is:

1. In a wheeled vehicle, the combination with an occupant-controlled steering medium, of a wheel-and-axle assembly with respect to the wheels of which said steering medium is adapted to exercise steering control, said assembly including a draft head, a link unit pivotally connected to said head, releasable latch means for retaining said link unit in a generally forwardly extended position with relation to the vehicle and adapted to be released so as to condition said link unit for movement toward a position of alignment with relation to said head, a tongue pivotally connected to said link unit, and releasable clutch means for connecting said head to and disconnecting it from said wheels whereby said tongue is rendered selectively operable and inoperable as a steering medium with relation to said wheels, said head upon being disconnected from said wheels being rendered freely rotatable to such a position that when said link unit is moved from unlatched to latched position it will extend generally toward the rear of the vehicle and will there serve to support said tongue in inactive position.

2. In a wheeled vehicle, the combination with an occupant-controlled steering column, of a wheel-and-axle assembly with respect to the wheels of which said steering column is adapted to exercise steering control, said assembly including a draft head, a link unit pivotally connected to said head, releasable latch means for retaining said unit in a generally forwardly extended position with relation to the vehicle and adapted to be released so as to condition said link unit for movement toward a position of alignment wth relation to said head, a tongue pivotally connected to said link unit, and releasable clutch means for connecting said head to and disconnecting it from said wheels whereby said tongue is rendered selectively operable and inoperable as a steering medium with relation to said wheels, said clutch means including a clutch unit connected to said steering column and adapted to be interlocked with and disconnected from said head, said head upon being disconnected from said wheels being rendered free to rotate to such a position that when said link unit is moved from unlatched to latched position it will extend generally toward the rear of the vehicle and will there serve to support said tongue in inactive position.

3. In a wheeled vehicle, a wheel-and-axle assembly of the stub axle type comprising a connector element coupling the stub axles of said assembly together for movement in unison, a rotatable draft head, a tongue associated with said head, a rotatable steering column having one end journalled in said head for rotation about the axis thereof, and releasable clutch means in the form of a U-shaped spring-like element having a pair of arms to which said connector element is pivotally connected, one of said arms being rigidly connected to said steering column and the other of said arms being adapted to be connected to and disconnected from said head whereby said tongue is rendered selectively operable and inoperable as a steering medium with relation to said stub axles and their associated wheels.

4. In a wheeled vehicle, a rear wheel-and-axle assembly, a front wheel-and-axle assembly comprising a rotatable draft head, a tongue, a link unit pivotally connected to said tongue and to said head, latch means for retaining said link unit in a generally rearwardly extending position with relation to the vehicle whereby it in conjunction with the rear wheel-and-axle assembly may be utilized to support said tongue in inactive position, and clutch means rendered operable to connect said head to the wheels of said front wheel-and-axle assembly upon releasing said link unit from tongue-supporting position and upon rotating said head to an active position such that said link unit when moved to latched position will extend generally forwardly with relation to the vehicle.

5. In a wheeled vehicle, a rear wheel-and-axle assembly, a front wheel-and-axle assembly comprising a rotatable steering column, a draft head supported for rotation about the axis of said column, a tongue, a link unit pivotally connected to said tongue and to said draft head, latch means for retaining said link unit in a generally rearwardly extending position with relation to the vehicle whereby it in conjunction with the axle of the rear wheel-and-axle assembly may be utilized to support said tongue in inactive position, a connector element coupling the stub axles of said front wheel-and-axle assembly together for movement in unison, and clutch means rendered operable to connect said head to said connector element upon releasing said link unit from tongue-supporting position and upon rotating said head to an active position such that said link unit when moved to latched position will extend generally forwardly with relation to the vehicle, said clutch means being in the form of a U-shaped spring-like element having a pair of arms pivotally connected to said connector element, one of said arms being rigidly connected to said steering column and the other of said arms being adapted for interlocking connection with said head upon rotation of said head to active position.

6. In a wheeled vehicle, a wheel-and-axle assembly comprising a pair of brackets, each including a pair of strut-like arms and a pair of laterally extending lug-like bearing elements; a stub-shaft connected to and pivotally supported intermediate each pair of said bearing elements; a tie member reaching from one to the other of said brackets, said tie member being connected to each of said brackets and overlying at its opposite ends one of said lug-like members of each pair of such members; a bearing sleeve associated with said tie member; a draft unit pivotally supported with relation to said tie member, said draft unit including a coupling head journalled in said bearing sleeve and having a flange supported on said bearing sleeve and serving to retain said coupling head against longitudinal displacement in one direction; and means cooperating with said bearing sleeve to retain said head against longitudinal displacement in an opposite direction.

HARRISON BUCKLIN.